United States Patent
Nagano et al.

(10) Patent No.: US 10,753,895 B2
(45) Date of Patent: Aug. 25, 2020

(54) ORIENTATION EVALUATION DEVICE, ORIENTATION EVALUATION METHOD, AND DISTRIBUTION EVALUATION DEVICE

(71) Applicant: NATIONAL UNIVERSITY CORPORATION NAGOYA UNIVERSITY, Nagoya-shi, Aichi (JP)

(72) Inventors: Hosei Nagano, Nagoya (JP); Ryouhei Fujita, Nagoya (JP)

(73) Assignees: NATIONAL UNIVERSITY CORPORATION TOKAI, Nagoya-shi (JP); NATIONAL HIGHER EDUCATION AND RESEARCH SYSTEM, Nagoya-shi (JP)

( * ) Notice: Subject to any disclaimer, the term of this patent is extended or adjusted under 35 U.S.C. 154(b) by 192 days.

(21) Appl. No.: 15/580,633

(22) PCT Filed: Jun. 10, 2016

(86) PCT No.: PCT/JP2016/067370
§ 371 (c)(1),
(2) Date: Dec. 7, 2017

(87) PCT Pub. No.: WO2016/199890
PCT Pub. Date: Dec. 15, 2017

(65) Prior Publication Data
US 2018/0224383 A1    Aug. 9, 2018

(30) Foreign Application Priority Data

Jun. 10, 2015 (JP) .................................. 2015-117288

(51) Int. Cl.
*G01K 1/16* (2006.01)
*G01N 25/18* (2006.01)
(Continued)

(52) U.S. Cl.
CPC ............. *G01N 25/18* (2013.01); *G01B 21/00* (2013.01); *G01N 25/72* (2013.01)

(58) Field of Classification Search
CPC ........ G01N 25/18; G01N 25/72; G01B 21/00; G01K 1/16
(Continued)

(56) References Cited

U.S. PATENT DOCUMENTS 4,373,977 A * 2/1983 Rothwarf ................. H01B 1/04
156/51
5,344,236 A * 9/1994 Fishman ................. G01N 25/72
356/237.5
(Continued)

FOREIGN PATENT DOCUMENTS

JP    2007-178429 A    7/2007
JP    2012-002547 A    1/2012

OTHER PUBLICATIONS

Kuribara et al., "Development of a Thermal Anisotropy Measurement Method for High-Thermal-Conductive Carbon Fiber Reinforced Plastic Composites Using a Lock-in Thermography," Japan Journal of Thermophysical Properties, May 31, 2014, vol. 28, No. 2, pp. 82-88.
(Continued)

Primary Examiner — Gail Kaplan Verbitsky
(74) Attorney, Agent, or Firm — Oliff PLC (57) ABSTRACT

An orientation evaluation device includes: a diode laser configured to periodically irradiate a sample with light to heat the sample, the sample being carbon fiber reinforced plastics; an infrared thermography configured to detect delay in response to a change in a temperature distribution of an area of the sample, the area including a spot heated by the diode laser; and a computer configured to output information on orientation of the sample based on the delay in the response detected by the infrared thermography. The orien-
(Continued)

tation evaluation device enables a non-contact and quick evaluation of the orientation of the sample.

11 Claims, 9 Drawing Sheets

(51) Int. Cl.
  *G01N 25/72* (2006.01)
  *G01B 21/00* (2006.01)
(58) Field of Classification Search
  USPC ........ 374/137, 4, 5, 121, 29, 30, 44, 35, 45, 374/130, 120, 124, 6; 250/338.1
  See application file for complete search history.

(56) References Cited

U.S. PATENT DOCUMENTS

| | | | |
|---|---|---|---|
| 5,863,467 A * | 1/1999 | Mariner | C08K 7/00 252/511 |
| 6,517,238 B2 * | 2/2003 | Sun | G01N 25/72 250/341.6 |
| 2005/0002435 A1 * | 1/2005 | Hashimoto | G01N 25/18 374/43 |
| 2007/0143061 A1 | 6/2007 | Ringermacher et al. | |
| 2013/0230072 A1 * | 9/2013 | Couse | G01N 25/72 374/5 |

OTHER PUBLICATIONS

Nagano, H., "CFRP no Sanjigen Netsu Dendo Ihosei o Hisesshoku de Keisoku Kano ni", Optical Alliance, Aug. 1, 2013, vol. 24, No. 8, p. 53-57.

Sep. 6, 2016 International Search Report issued in International Patent Application No. PCT/JP2016/067370.

Ishizaki et al; "Measurement of Three-Dimensional Anisotropic Thermal Diffusivities for Carbon Fiber-Reinforced Plastics Using Lock-In Thermography;" Int J Thermophys; (13 pages); Oct. 7, 2014.

* cited by examiner

ORIENTATION EVALUATION DEVICE, ORIENTATION EVALUATION METHOD, AND DISTRIBUTION EVALUATION DEVICE

TECHNICAL FIELD

The present invention relates to an orientation evaluation device, an orientation evaluation method, and a distribution evaluation device.

BACKGROUND ART

Carbon fiber reinforced composite materials are widely used in recent devices, such as aviation instruments and electronic devices. The carbon fiber reinforced composite materials have high thermal conductivity, anisotropy, or high specific rigidity. In the carbon fiber reinforced composite materials, the anisotropy generated by orientation of carbon fibers causes a large difference in mechanical properties (e.g. strength and rigidity) and thermal properties (e.g. thermal diffusivity and thermal conductivity), so that evaluation (measurement) of the anisotropy is important.

Examples of known fiber orientation evaluation methods include X-ray computed tomography (XCT) test and tensile test.

For example, patent document 1 discloses analyzing a tendency of an orientation state of a filler in a part of a resin molded product using a power spectrum image. The power spectrum image is obtained by binarizing a slice image of the resin molded product obtained by the XCT test and Fourier transforming the binarized image.

CITATION LIST

Patent Literature

Patent document 1: Japanese Unexamined Patent Application Publication No. 2012-2547

SUMMARY OF INVENTION

Technical Problem

If the XCT test or the tensile test is applied as the fiber orientation evaluation method, these tests require steps to contact a measurement sample, e.g. to cut out the measurement sample. Further, if the XCT test or the tensile test is applied as the fiber orientation evaluation method in a manufacturing process of the carbon fiber reinforced composite materials, these test require a long measurement time or large scale devices. In other words, the XCT test and the tensile test have difficulty in being applied to an in-line measurement.

To solve the problems described above, an object of an aspect of the present invention is to provide, for example, an orientation evaluation device which enables a non-contact and quick evaluation of an orientation of a sample.

Solution to Problem

Solutions to the above problem may include the following aspects. An aspect of the present invention according to claim 1 provides an orientation evaluation device including: a heating portion configured to periodically irradiate a sample with light to heat the sample, the sample including plural materials; a detecting portion configured to detect delay in response to a change in a temperature distribution of an area of the sample, the area including a spot heated by the heating portion; and an output portion configured to output information on orientation of at least one material included in the sample based on the delay in the response detected by the detecting portion.

An aspect of the present invention according to claim 3 provides the orientation evaluation device according to claim 1, wherein the sample includes a reinforcement material of a fiber shape and a base material holding the reinforcement material, and the output portion outputs the information on the orientation of the reinforcement material in the sample.

An aspect of the present invention according to claim 4 provides the orientation evaluation device according to claim 1, wherein the output portion outputs information on thermal diffusivity of the sample with the information on the orientation of the sample, based on the delay in the response detected by the detecting portion.

An aspect of the present invention according to claim 5 provides the orientation evaluation device according to claim 1, wherein the output portion outputs the orientation of the sample in a form of polar coordinates, based on the delay in the response detected by the detecting portion.

An aspect of the present invention according to claim 6 provides the orientation evaluation device according to claim 1, further including a moving portion configured to change a relative position between the sample and a pair of the heating portion and the detecting portion, wherein the heating portion successively heats each one of portions of the sample, the sample being divided into the portions, each portion being periodically heated, the detecting portion successively detects each one of temperature distributions of the respective portions successively heated by the heating portion, and the output portion outputs information on the orientation of each portion of the sample.

An aspect of the present invention according to claim 7 provides the orientation evaluation device according to claim 1, wherein the heating portion includes plural light emitting portions, the plural light emitting portions being arranged in a line such that irradiation positions of the respective light emitting portions are aligned with centers of respective areas to be measured, the detecting portion includes plural temperature detecting portions detecting temperature distributions of the respective areas, and the orientation evaluation device further includes a moving portion configured to change a relative position, in a direction crossing the line, between the sample and a set of the plural light emitting portions and the plurality of temperature detecting portions.

An aspect of the present invention according to claim 8 provides a method for evaluating orientation including: periodically irradiating a sample with light to heat the sample, the sample including plural materials; detecting delay in response to a change in a temperature distribution of an area of the sample, the area including a heated spot; and outputting information on orientation of at least one material included in the sample based on the delay in the detected response.

An aspect of the present invention according to claim 9 provides a distribution evaluation device including: a heating portion configured to periodically irradiate a sample with light to heat the sample, the sample including plural materials; a detecting portion configured to detect delay in response to a change in a temperature distribution of an area of the sample, the area including a spot heated by the heating portion; and an output portion configured to output information on a distribution of at least one material included in the sample based on the delay in the response detected by the detecting portion.

Advantageous Effects of Invention

According to the aspect of the present invention according to claim 1, it is possible to provide the orientation evaluation device which enables the non-contact and quick evaluation of the orientation of the sample.

According to the aspect of the present invention according to claim 2, it is possible to improve accuracy of the evaluation of the orientation of the sample.

According to the aspect of the present invention according to claim 3, it is possible to evaluate the orientation of the reinforcement material.

According to the aspect of the present invention according to claim 4, it is possible to understand a thermal property of the sample with the orientation of the sample.

According to the aspect of the present invention according to claim 5, it is possible to visually understand the orientation of the sample.

According to the aspect of the present invention according to claim 6, it is possible to evaluate the orientation of a wider area of the sample.

According to the aspect of the present invention according to claim 7, it is possible to evaluate the orientation of a wider area of the sample in a short time.

According to the aspect of the present invention according to claim 8, it is possible to provide the orientation evaluation method which enables the non-contact and quick evaluation of the orientation of the sample.

According to the aspect of the present invention according to claim 9, it is possible to provide the distribution evaluation device which enables the non-contact and quick evaluation of the distribution of the sample.

DESCRIPTION OF EMBODIMENTS

Hereinafter, an exemplary embodiment according to the present invention will be described with reference to the attached drawings.

<Configuration of Orientation Evaluation Device 100>

Figure 1:
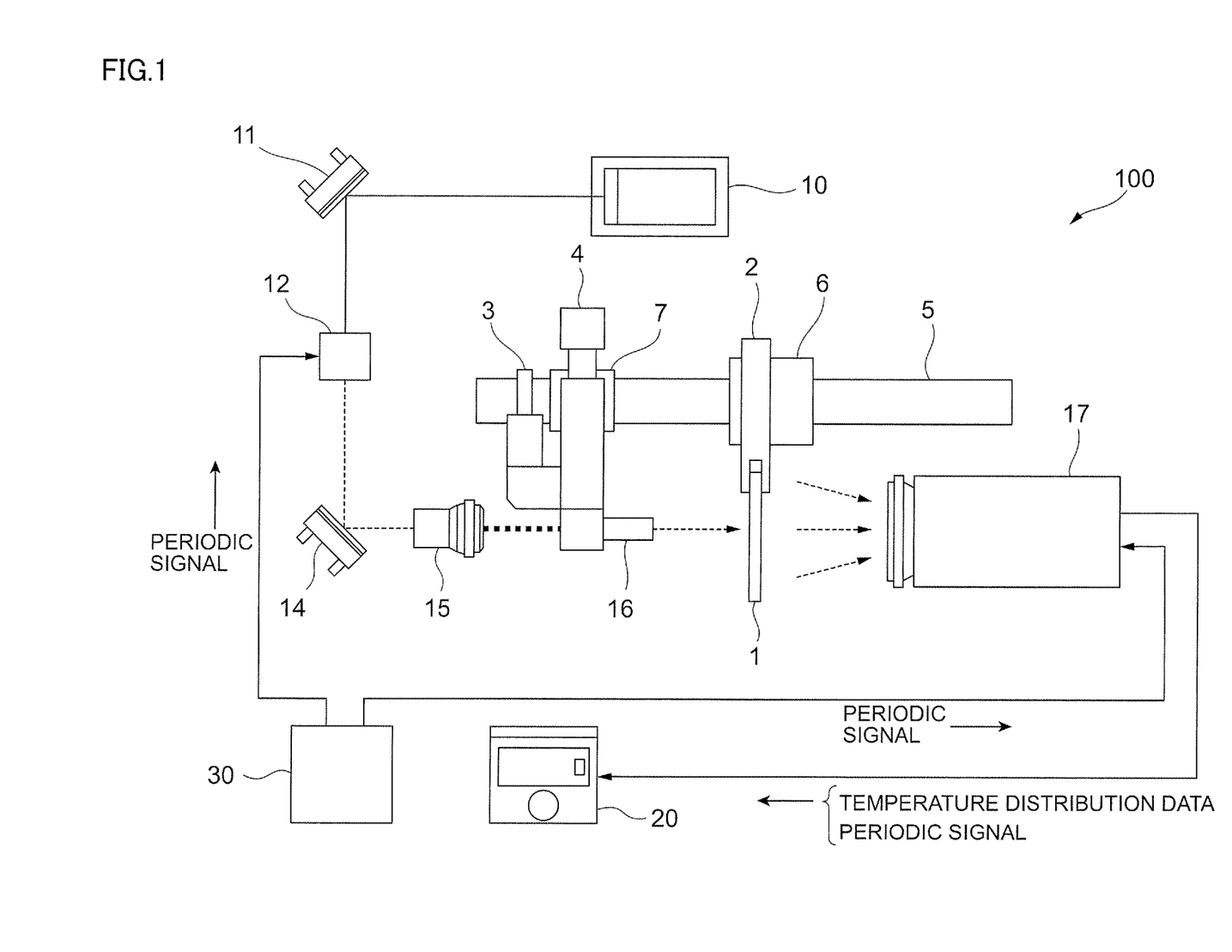
FIG. 1 depicts a schematic view of a configuration of the orientation evaluation device according to an exemplary embodiment of the present invention.

Firstly, a configuration of an orientation evaluation device 100 will be explained with reference to FIG. 1. FIG. 1 depicts a schematic view of a configuration of the orientation evaluation device 100 according to an exemplary embodiment of the present invention.

As shown in FIG. 1, the orientation evaluation device 100 according to the exemplary embodiment includes: a holder 2 holding a measurement sample 1 having a plate shape; a light emitting diode 3 emitting a reference light; a CCD imaging device 4 capturing an image of one side (front surface) of the measurement sample 1; a rail 5 extending in one direction; a first XYZ stage 6 provided on the rail 5 to hold the holder 2; and a second XYZ stage 7 provided on the rail 5 to hold the light emitting diode 3 and the CCD imaging device 4.

The orientation evaluation device 100 further includes: a diode laser 10 serving as a heating light source (an example of a heating portion); a first mirror 11 reflecting a laser beam emitted from the diode laser 10; an acousto-optic device 12 converting the laser beam into a periodic signal (generating a pulse signal); a second mirror 14 reflecting the laser beam from the acousto-optic device 12; a beam expander 15 expanding a beam diameter of the laser beam from the second mirror 14; and a microscope 16 adjusting (focusing) the beam diameter of the laser beam incident on the front surface of the measurement sample 1.

The orientation evaluation device 100 further includes: an infrared thermography 17 (lock-in thermography, an example of a detecting portion) provided at the opposite side of the microscope 16 relative to the measurement sample 1; a computer 20 (an example of an output portion) receiving a signal from the infrared thermography 17; and a periodic signal generator 30 generating a periodic signal to output it to the acousto-optic device 12 and the infrared thermography 17.

In the orientation evaluation device 100 with the above configuration, the laser beam emitted from the diode laser 10 is converted into the periodic signal by the acousto-optic device 12. The laser beam then passes the beam expander 15 and the microscope 16 to be incident on the measurement sample 1. The laser beam is incident on a spot (an area) in the measurement sample 1 to periodically heat the spot. That is to say, a specific point (position) on the surface of the measurement sample 1 is periodically heated.

The infrared thermography 17 at a rear side of the measurement sample 1 measures temperature of the measurement sample 1 heated by the laser beam from the diode laser 10. Note that the infrared thermography 17 captures (measures) an image, as an infrared image, of a predetermined area (spot) including the spot periodically heated by the diode laser 10. Specifically, assuming that the periodically heated spot has a substantially round shape and the predetermined area captured by the infrared thermography 17 has a substantially rectangular shape, a size (a diameter) of the periodically heated spot is 0.1 μm to 1 mm while a size (length of one side) of the predetermined area is 10 mm to 100 mm.

The infrared thermography 17 receives the periodic signal from the periodic signal generator 30. The infrared thermography 17 measures temperature data (temperature distribution data) to output it with the periodic signal to the computer 20.

The computer 20 successively performs, with the infrared thermography 17, capture of the infrared image and calculation based on a frame rate at optionally set intervals (fixed intervals). The computer 20 then generates an averaged image (lock-in analysis) from a temperature change amount, which changes over time. More specifically, the computer 20 processes the data gained by the infrared thermography 17 to calculate a direction (an angle) relative to a heated area Hp (see FIG. 5A), thermal diffusivity, and a fiber orientation.

<Functional Composition of Orientation Evaluation Device 100>

Figure 2:
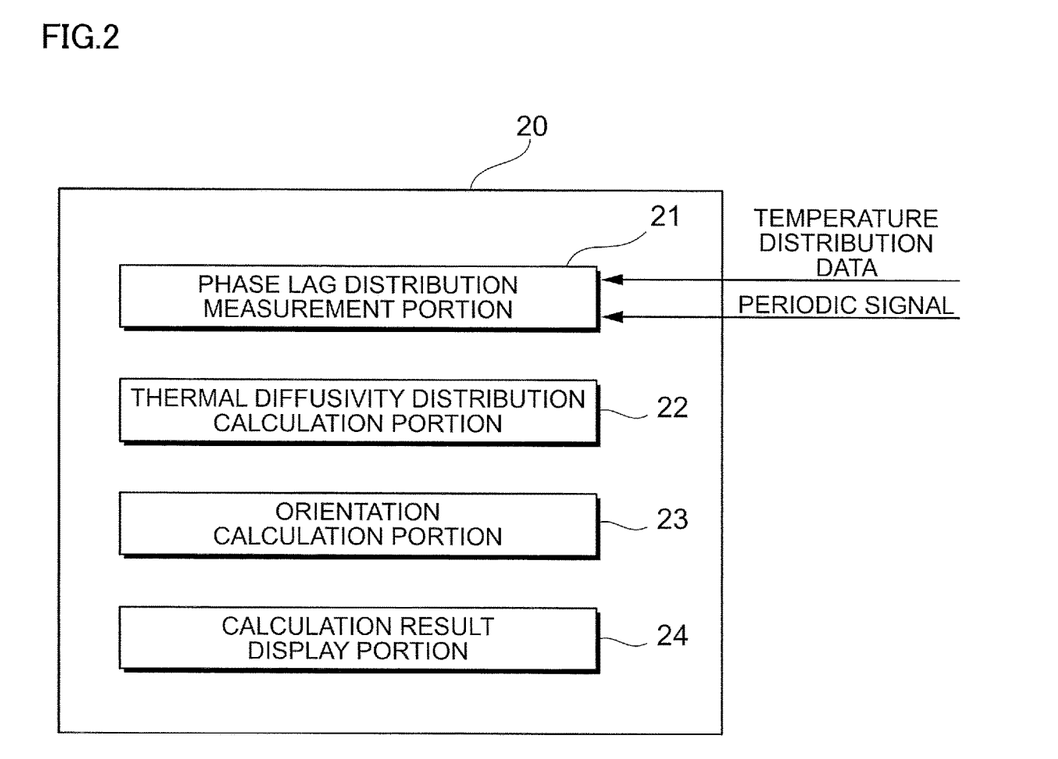
FIG. 2 depicts a block diagram of the computer.

A functional composition of the computer 20 according to the present exemplary embodiment will be explained with reference to FIG. 2. FIG. 2 depicts a block diagram of the computer 20.

As shown in FIG. 2, the computer 20 according to the present exemplary embodiment includes: a phase lag distribution measurement portion 21 measuring a phase lag distribution based on the temperature distribution data and the periodic signal input from the infrared thermography 17 (see FIG. 1); a thermal diffusivity distribution calculation portion 22 calculating the thermal diffusivity distribution based on the measured phase lag; an orientation calculation portion 23 calculating the fiber orientation (described later) of the measurement sample 1 (see FIG. 1) based on the calculated thermal diffusivity distribution; and a calculation result display portion 24 displaying a calculation result of the thermal diffusivity distribution and the fiber orientation.

The computer 20 may include a central processing unit (CPU) executing a calculation process, a read only memory (ROM) storing, for example, programs and various data executed by the CPU, a random access memory (RAM) used as, for example, a working memory of the CPU, and an electrically erasable and programmable read only memory (EEPROM). The computer 20 performs the above mentioned functions with these components. Note that these components are not illustrated in the figure.

The computer 20 according to the present exemplary embodiment evaluates (determines) the fiber orientation of the measurement sample 1 (see FIG. 1) based on a change in the temperature distribution of the measurement sample 1 obtained by the infrared thermography 17. More specifically, the computer 20 determines the fiber orientation of the measurement sample 1 based on delay in response to a change in the temperature distribution of the measurement sample 1. Note that the present exemplary embodiment assumes a thermal characteristic of the measurement sample 1 to be the fiber orientation of the measurement sample 1.

The measurement sample 1 of the example shown in the figure may be carbon fiber composite materials, more specifically, carbon fiber reinforced plastics (CFRP, carbon fiber reinforced plastics). The measurement sample 1 may be made of pitch-based carbon fiber reinforced plastics, which are obtained by impregnating resin (a base material), e.g. epoxy resin, into so-called pitch-based carbon fibers (a reinforcement material) made from petroleum pitch.

The pitch-based carbon fibers have higher thermal conductivity than the resin impregnated into the pitch-based carbon fibers. More specifically, the pitch-based carbon fibers have thermal conductivity (thermal diffusivity) being significantly different from that of the resin, which has relatively low thermal conductivity. Note that the pitch-based carbon fiber reinforced plastics are merely an example. It is only required that there is a difference in thermal conductivity (thermal diffusivity) between the carbon fibers and the resin. For example, polyacrylonitrile-based (PAN-based) carbon fibers, which have relatively low thermal diffusivity, can be applicable.

The carbon fiber reinforced plastics of the example shown in the figure may be so-called discontinuous fiber composite materials. For example, length of the pitch-based carbon fibers may be approximately 0.1 mm to 10 mm, more specifically approximately 1 mm to 5 mm. Note that the discontinuous fiber composite materials are merely an example. Continuous fiber composite materials are also applicable. For example, the measurement sample 1 can be carbon fiber reinforced plastics having laminated continuous fiber prepregs.

The fiber orientation of the measurement sample 1 is an index representing the fiber orientation distribution of the fibers (the carbon fibers) included in the measurement sample 1, which is an example of an anisotropic material. In the present exemplary embodiment, the fiber orientation is represented by a fiber orientation angle (fiber orientation direction) and distribution of the fiber orientation angle (dispersion of the fiber orientation angle). Further, the fiber orientation angle represents an angle indicating the direction in which the fibers in the measurement sample 1 tend to be oriented. In other words, the fiber orientation angle represents an angle in which the fibers are preferentially oriented.

<Measurement Principle>

Next, a measurement principle according to the present exemplary embodiment will be explained.

Figure 3A:
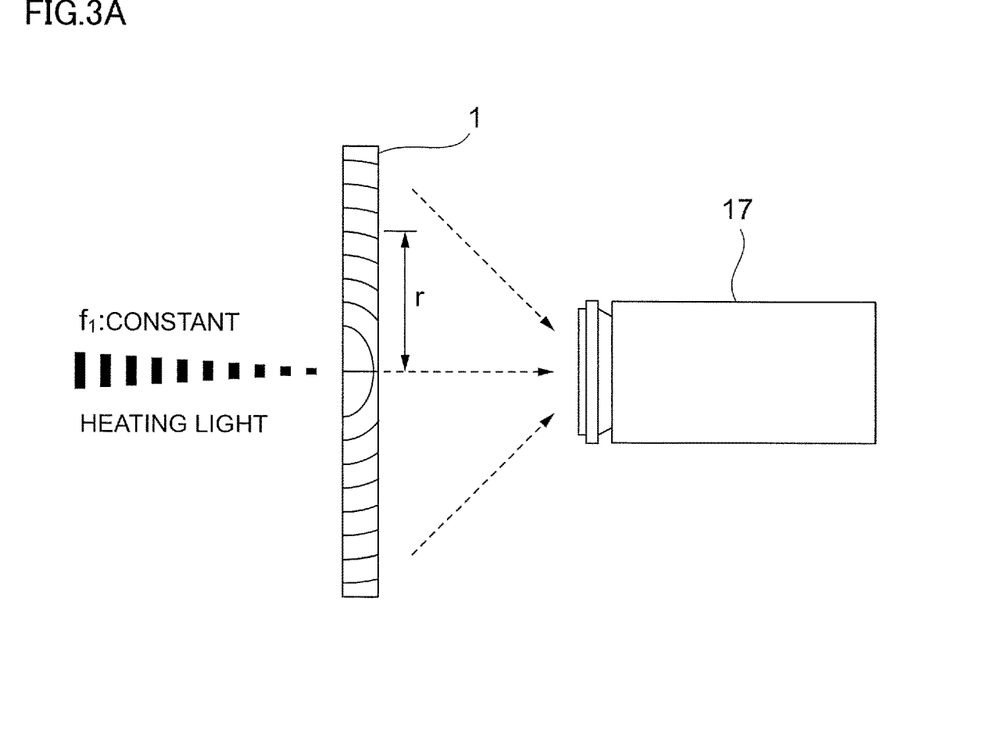
FIGS. 3A and 3B depict the measurement principle of the in-plane thermal diffusivity.
Figure 3B:
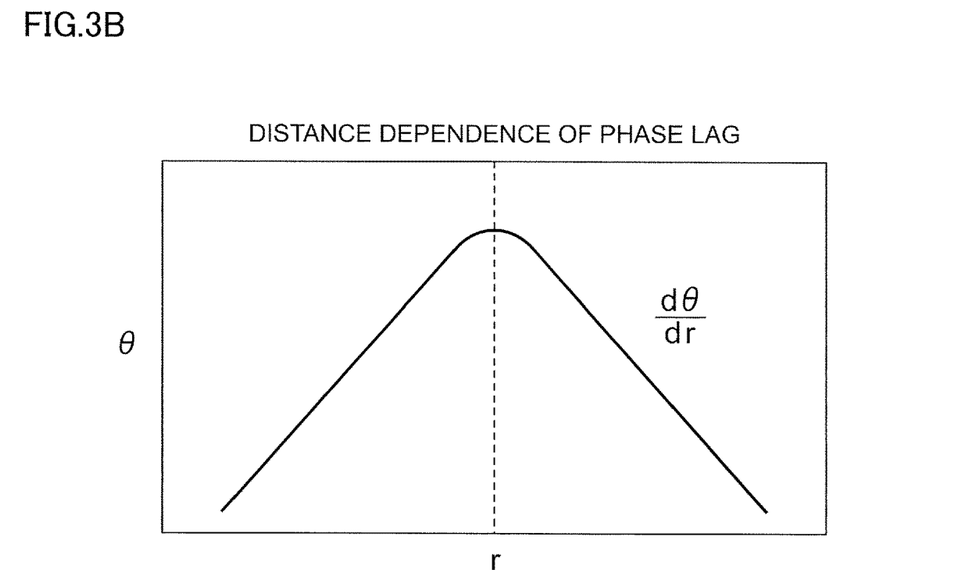

Firstly, the measurement principle of in-plane thermal diffusivity of the measurement sample 1 will be explained with reference to FIGS. 3A and 3B. FIGS. 3A and 3B depict the measurement principle of the in-plane thermal diffusivity.

In the example shown in the figure, the in-plane thermal diffusivity is measured by the infrared thermography 17 provided at the rear side of the measurement sample 1 whose front surface is irradiated with heating light (laser beam) having a constant frequency. In the present example, distance dependence of the phase lag is detected.

Here, the present example assumes that a spot irradiated with the heating light is a point heat source, so that temperature response $T_{ac}$ on a position at a distance r from the point heat source is expressed by the following formula (1).

<Formula (1)>

$$T_{ac}=T_0 e^{i(2\pi ft-kr)}e^{-kr}r^{-1} \qquad (2)$$

In the formula (1), $T_0$ is a constant (Km), f is a heating frequency (Hz), t is time (s), and r is a distance (m).

The phase lag $\theta$ between the point heat source and the temperature response $T_{ac}$ is expressed by the following formula (2).

<Formula (2)>

$$\theta = -\sqrt{\pi f/D} \times r \qquad (2)$$

In the formula (2), f1 is a heating frequency (constant, Hz), and D is thermal diffusivity (mm²/s).

The in-plane thermal diffusivity D of the measurement sample 1 is expressed by the following formula (3).

⟨Formula (3)⟩

$$D = \pi f_1 \bigg/ \left(\frac{d\theta}{dr}\right)^2 \qquad (3)$$

Figure 4A:
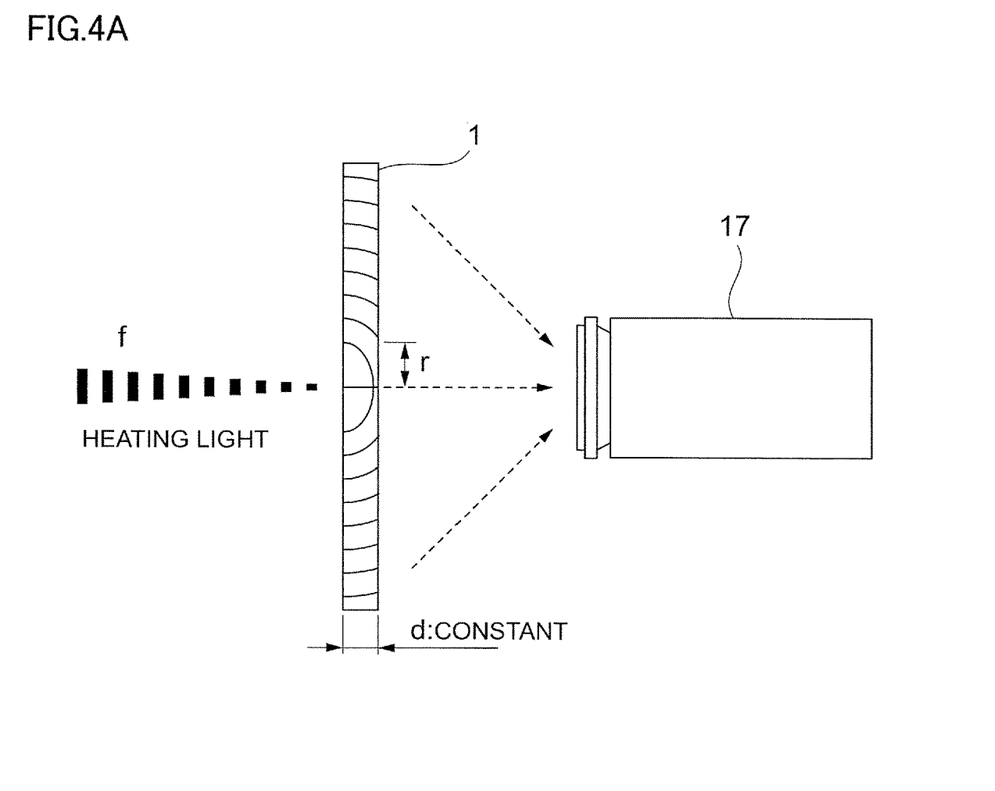
FIGS. 4A and 4B depict the measurement principle of the out-of-plane thermal diffusivity.
Figure 4B:
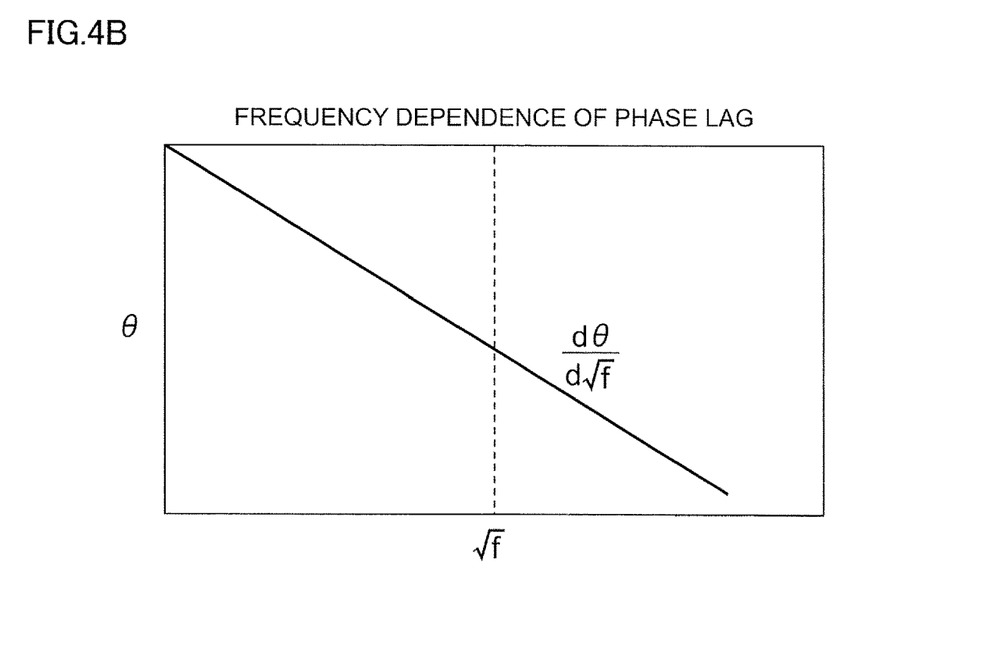

Next, a measurement principle of out-of-plane thermal diffusivity of the measurement sample 1 will be explained with reference to FIGS. 4A and 4B. FIGS. 4A and 4B depict the measurement principle of the out-of-plane thermal diffusivity.

Here, the present example assumes that the measurement is conducted by changing the frequency of the heating light incident on the measurement sample 1 having a constant thickness d. In the present example, frequency dependence of the phase lag is detected.

The out-of-plane thermal diffusivity D of the measurement sample 1 is expressed by the following formula (4).

⟨Formula (4)⟩

$$D = \pi d^2 \Big/ \left(\frac{d\theta}{d\sqrt{f}}\right)^2 \quad (4)$$

In the formula (4), d is the thickness of the measurement sample 1 (constant, mm).

Figure 5A:
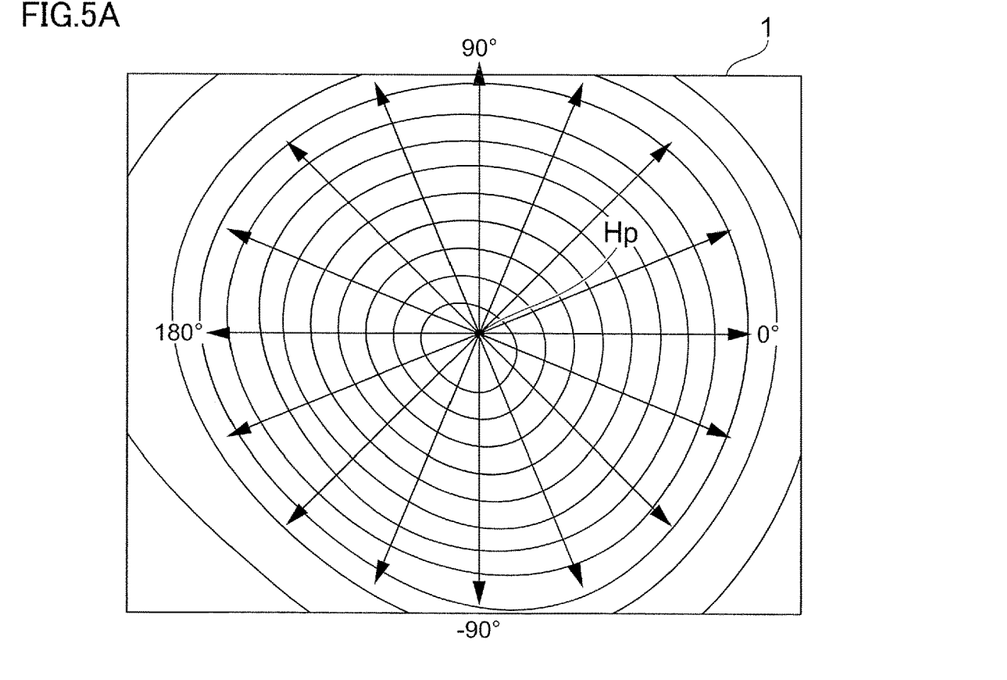
FIG. 5A depicts a direction of the thermal diffusion in the measurement sample.
Figure 5B:
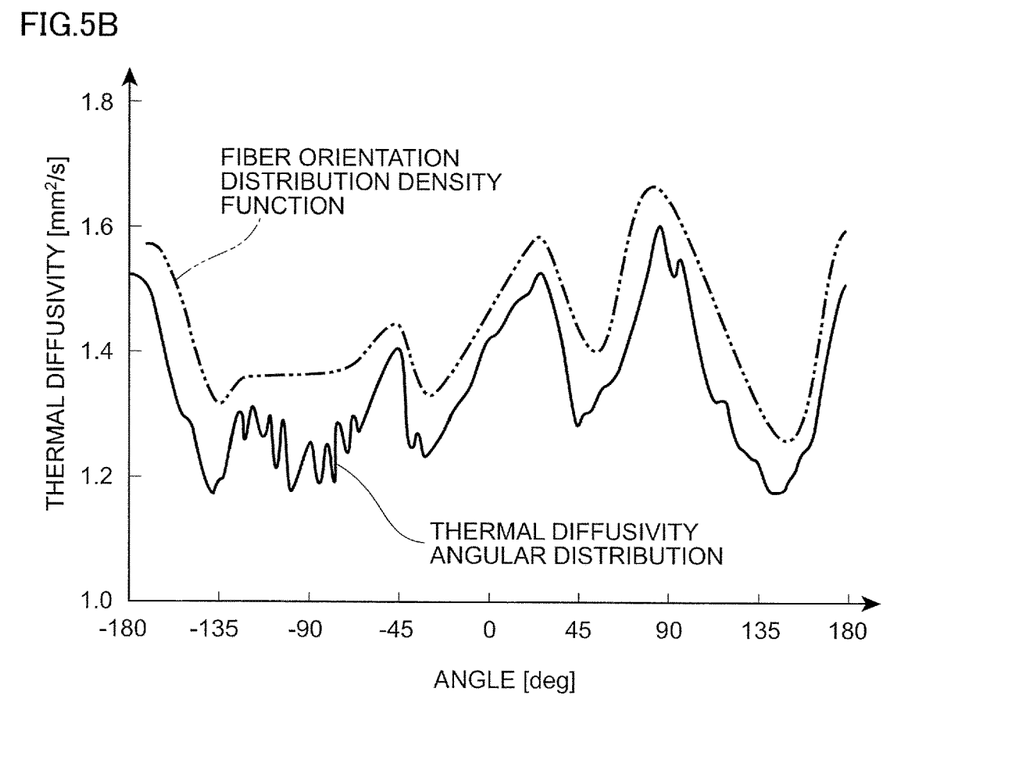
FIG. 5B depicts relationship between an angle of the thermal diffusion, the thermal diffusivity, and fiber orientation distribution density.

Next, a measurement principle of the orientation distribution of the measurement sample 1 will be explained with reference to FIGS. 5A and 5B. FIG. 5A depicts a direction of the thermal diffusion in the measurement sample 1. FIG. 5B depicts relationship between an angle of the thermal diffusion, the thermal diffusivity, and fiber orientation distribution density.

As shown in FIG. 5A, a phenomenon of the thermal diffusion from the heated area Hp varies depending on the orientation of the carbon fibers included in the measurement sample 1. That is to say, the heat from the heated area Hp is easy to be transmitted in a direction along the fiber orientation while the heat from the heated area Hp is hard to be transmitted in a direction crossing the fiber orientation. This yields difference in speed of thermal diffusion depending on the angle with respect to the heated area Hp in the measurement sample 1. In other words, the thermal diffusivity changes depending on the angle with respect to the heated area Hp in the measurement sample 1.

Here, FIG. 5B shows a measurement result of the thermal diffusivity, measured by the orientation evaluation device 100 in several directions with respect to the heated area Hp in the measurement sample 1. As shown in FIG. 5B, the thermal diffusivity changes depending on the angle.

Further, the present exemplary embodiment calculates an average and dispersion of the fiber orientation distribution based on the obtained thermal diffusivity angular distribution. Specifically, the average and the dispersion of the fiber orientation distribution are calculated by a fiber orientation distribution density function, which is derived from the obtained thermal diffusivity angular distribution. The fiber orientation distribution density function is derived by fitting with the least-squares method. Note that the thermal diffusivity angular distribution is assumed to include multiple peaks. The thermal diffusivity angular distribution is divided into sections including the respective peaks, so that the least-squares method is applied to the respective peaks.

The fiber orientation distribution density function is expressed by the following formula (5).

⟨Formula (5)⟩

$$g(\theta) = \frac{\left\{\sin\left(\frac{\theta-\eta}{\xi}\right)\right\}^{2P-1} \left\{\cos\left(\frac{\theta-\eta}{\xi}\right)\right\}^{2Q-1}}{\int_{\theta a}^{\theta b} \left\{\sin\left(\frac{\theta-\eta}{\xi}\right)\right\}^{2P-1} \left\{\sin\left(\frac{\theta-\eta}{\xi}\right)\right\}^{2P-1} d\theta} \quad (5)$$

In the formula (5), η is an offset angle (rad), ξ is a parameter for determining distribution size (dimensionless number), P is a first fitting parameter, and Q is a second fitting parameter.

Each parameter has the following relationship: η≤θa≤θ≤θb≤180°, P≥½, Q≥½, ξ≥2, and η≥0.

Further, based on the first fitting parameter P and the second fitting parameter Q, the average μ and the dispersion $\sigma^2$ (standard deviation σ) of the distribution is expressed by the following formula (6).

⟨Formula (6)⟩

$$\mu = \frac{P}{P+Q}, \sigma^2 = \frac{PQ}{(P+Q)^2(P+Q+1)} \quad (6)$$

Further, based on the average μ of the distribution, the fiber orientation angle $\theta_0$ is expressed by the following formula (7). In the formula, "section including the peak" corresponds to a resolution angle.

<Formula (7)>

$$\theta_0 = (\text{SECTION INCLUDING PEAK}) \times \mu \quad (7)$$

The dispersion $\sigma^2$ can be regarded as a degree of the fiber orientation because the dispersion $\sigma^2$ represents a degree of concentration to the fiber orientation direction.

<Operation>

Figure 6:
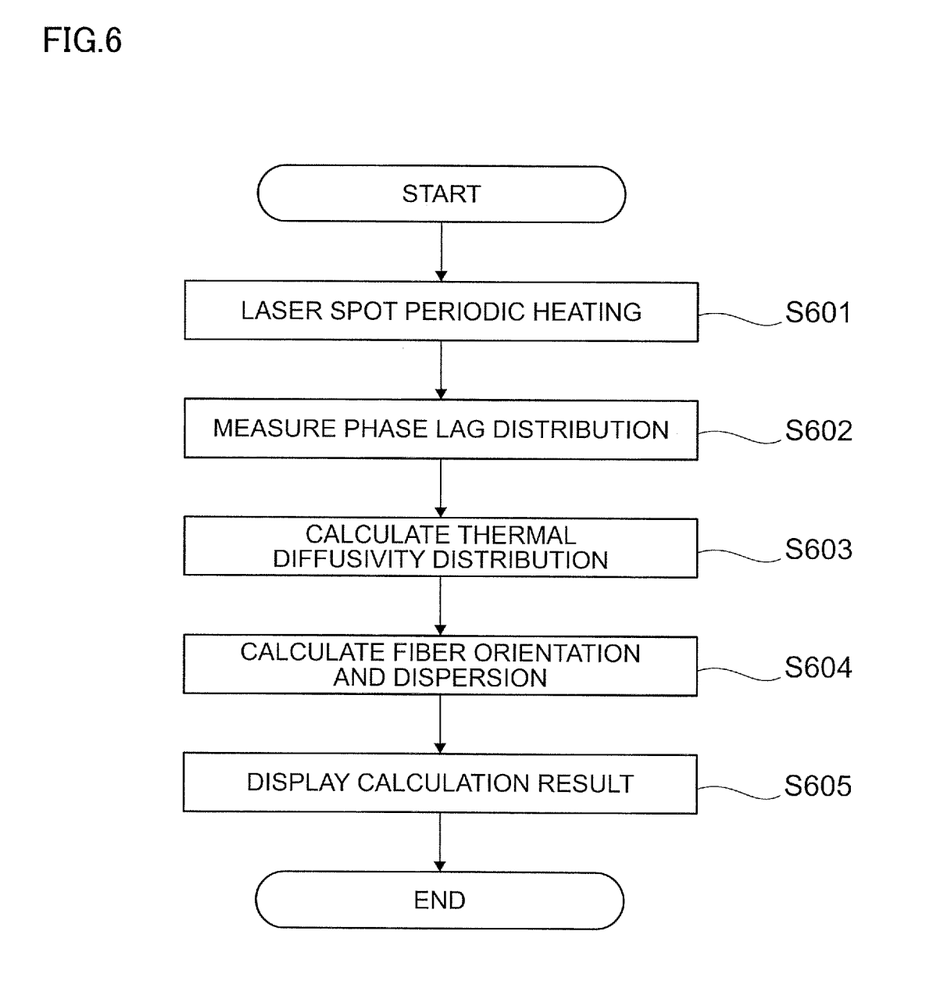
FIG. 6 depicts a flowchart of the operation of the orientation evaluation device.

An operation of the orientation evaluation device 100 according to the present exemplary embodiment will be explained with reference to FIGS. 1 and 6. FIG. 6 depicts a flowchart of the operation of the orientation evaluation device 100 (see FIG. 1).

The diode laser 10 of the orientation evaluation device 100 emits the laser beam to periodically heat the spot on the surface of the measurement sample 1 (step 601).

The phase lag distribution measurement portion 21 then measures the phase lag distribution based on the temperature distribution measured by the infrared thermography 17 (step 602).

The thermal diffusivity distribution calculation portion 22 calculates the thermal diffusivity distribution based on the measured phase lag distribution (step 603). The orientation calculation portion 23 then calculates the fiber orientation and the dispersion based on the calculated thermal diffusivity angular distribution (step 604). The calculation result display portion 24 displays the calculation result of the fiber orientation and the dispersion on the display (not shown) (step 605).

<Measurement Result 1>

Figure 7A:
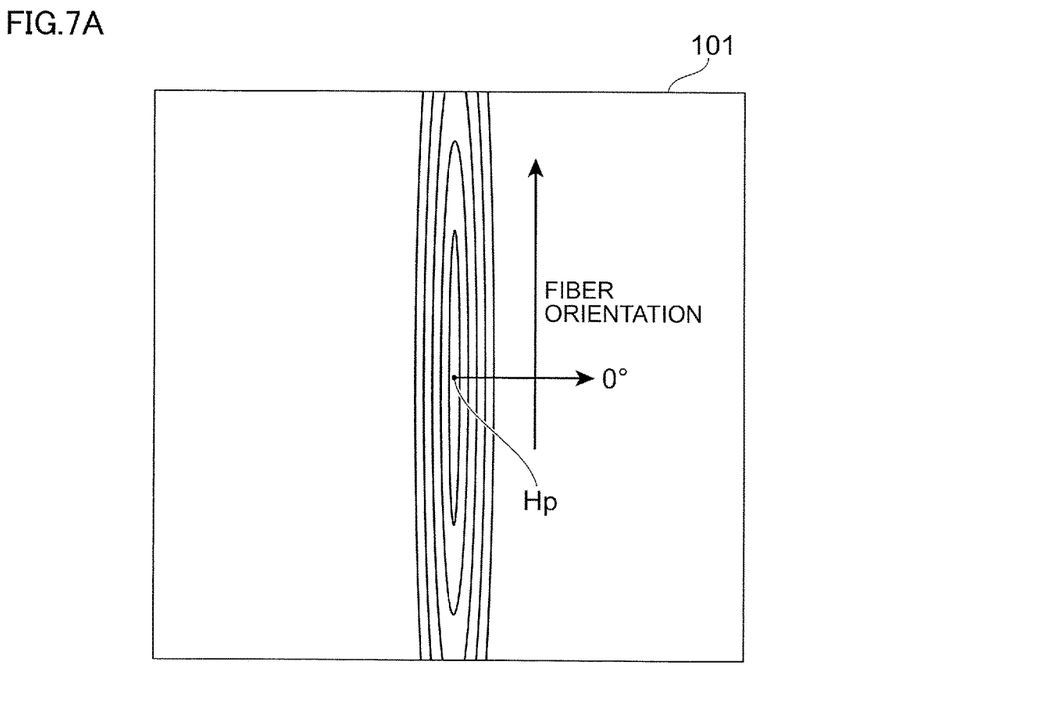
FIGS. 7A and 7B depict the measurement result 1 obtained by the orientation evaluation device.
Figure 7B:
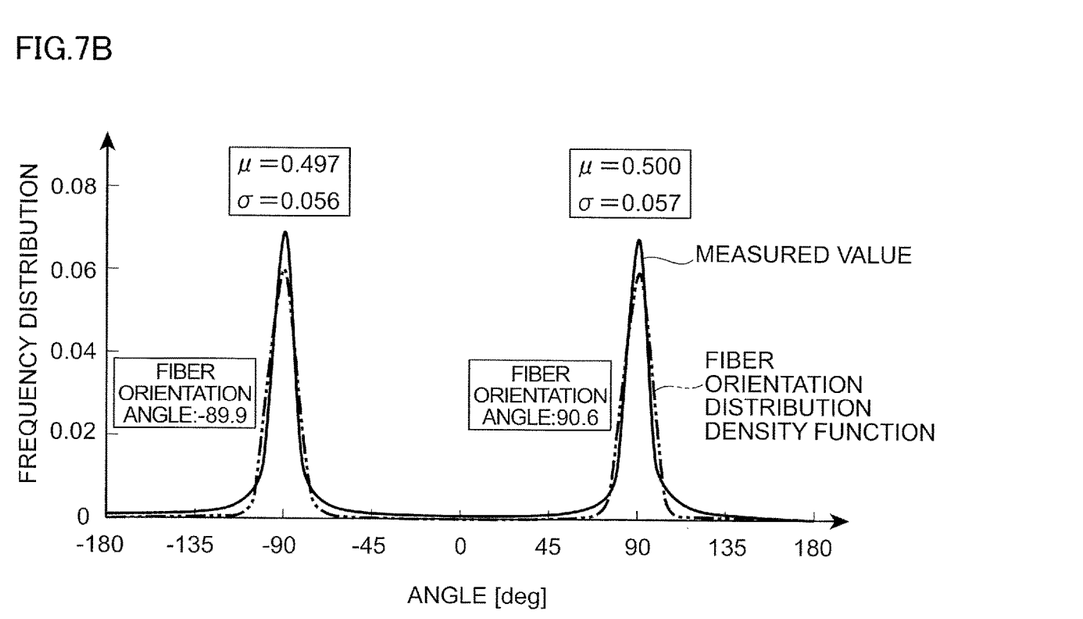

A measurement result 1 obtained by the orientation evaluation device 100 will be explained with reference to FIGS. 7A and 7B. FIGS. 7A and 7B depict the measurement result 1 obtained by the orientation evaluation device 100. Specifically, FIG. 7A depicts a graph of orientation (angle) of the thermal diffusion in a measurement sample 101. FIG. 7B depicts a graph representing a relationship between the orientation of the thermal diffusion and the fiber orientation distribution density function.

The result explained here with reference to FIG. 7A was obtained by using the CFRP including pitch-based unidirectional carbon fibers as the measurement sample 101. The orientation of the fibers is along the vertical direction in FIG. 7A.

As shown in FIG. 7B, frequency distribution of the fiber orientation distribution density function (and the measured value of the thermal diffusivity) becomes the maximum when the angle with respect to the heated area Hp in the measurement sample 101 is around 90° and −90°. If the angle deviates from 90° and −90°, the frequency distribution of the fiber orientation distribution density function drops sharply. From this result, the fiber orientation angle of the carbon fibers in the measurement sample 101 is estimated to be around 90° and −90°.

Specifically, in the example shown in the figure, the measurement result obtained by the above mentioned measurement principles was that the fiber orientation angles were 90.6° and −89.9, and the standard deviations σ were respectively 0.057 and 0.056. Further, the results of the averages μ of the distribution were respectively 0.500 and 0.497.

In the measurement result 1, the thermal diffusivity and the fiber orientation distribution density function were obtained in an optionally set angle to the heated area Hp. This can avoid multiple measurements conducted in multiple times at different angles of the measurement sample 101 by, for example, rotating the measurement sample 101. In the above measurement result, the thermal diffusivity and the fiber orientation distribution density function were obtained without a comparative measurement, i.e. data learning. The comparative measurement requires samples of which the characteristics such as the fiber orientation and the distribution density function are known.

According to the exemplary embodiment, the thermal diffusivity and the fiber orientation distribution density function are obtained in a short time compared to a measurement requiring rotation of the measurement sample 101, or a measurement requiring a data learning.

<Measurement Result 2>

A measurement result 2 obtained by the orientation evaluation device 100 will be explained with reference to FIGS. 8A, 8B, 9A, and 9B.

Figure 8A:
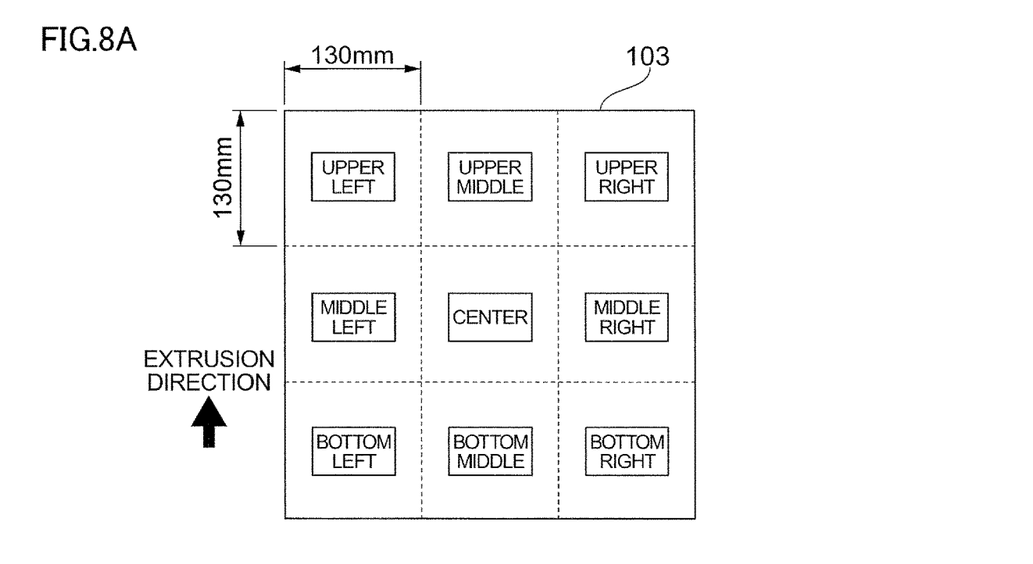
FIGS. 8A and 8B depict the measurement result 1 obtained by the orientation evaluation device.
Figure 8B:
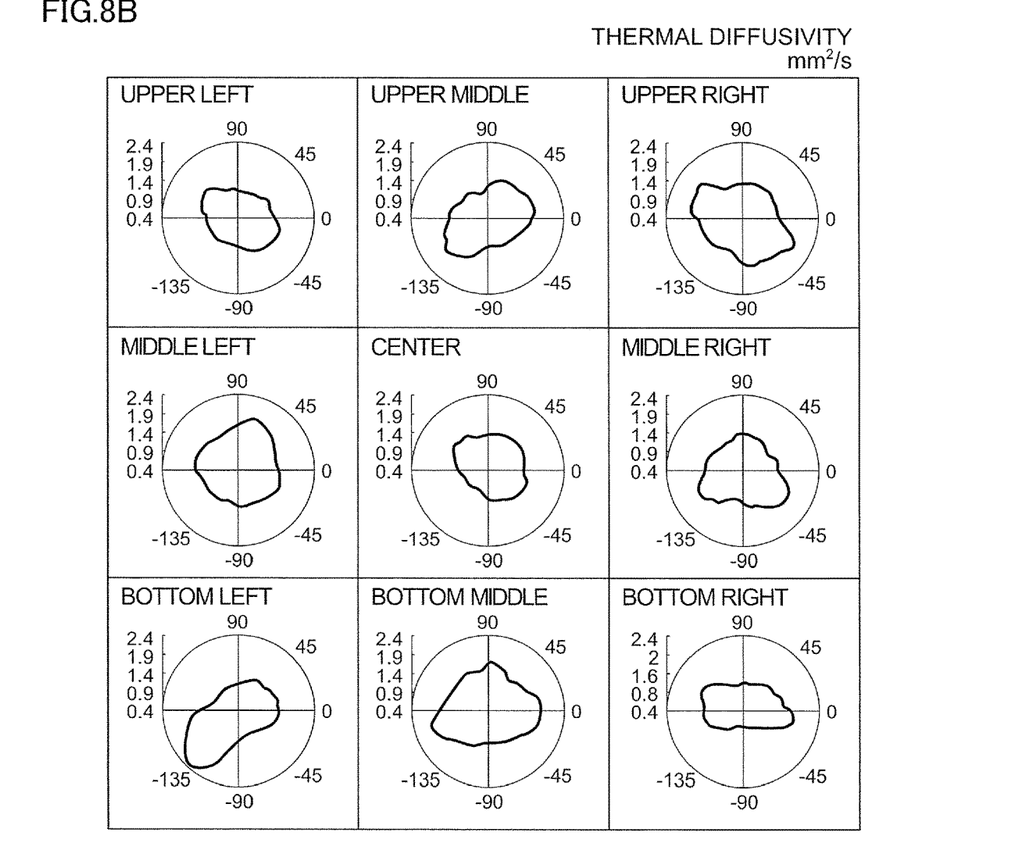
Figure 9A:
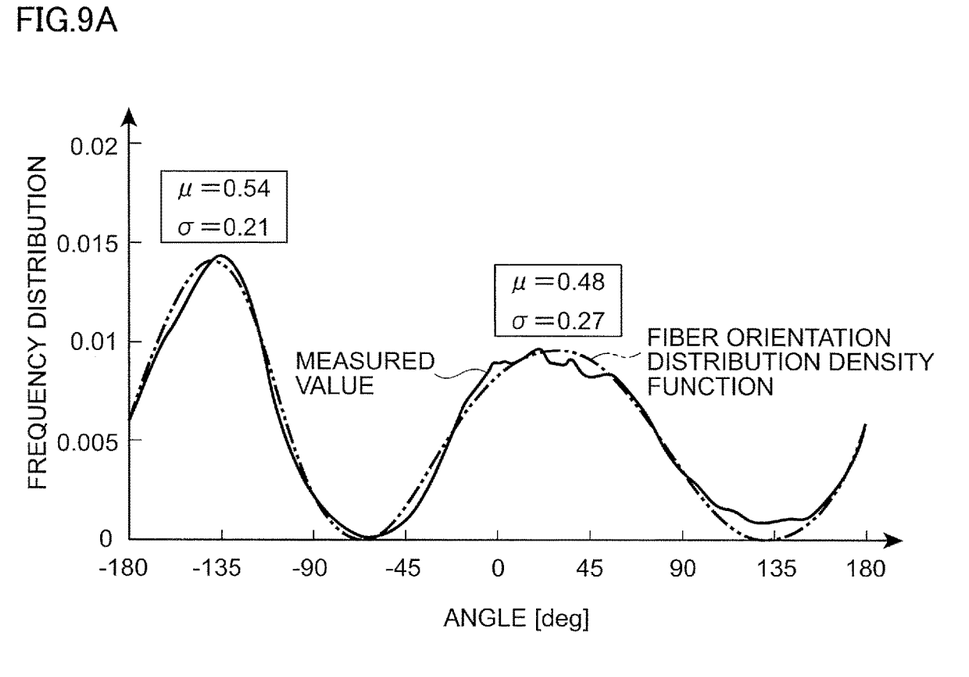
FIGS. 9A and 9B depict the measurement result 2 obtained by the orientation evaluation device.
Figure 9B:
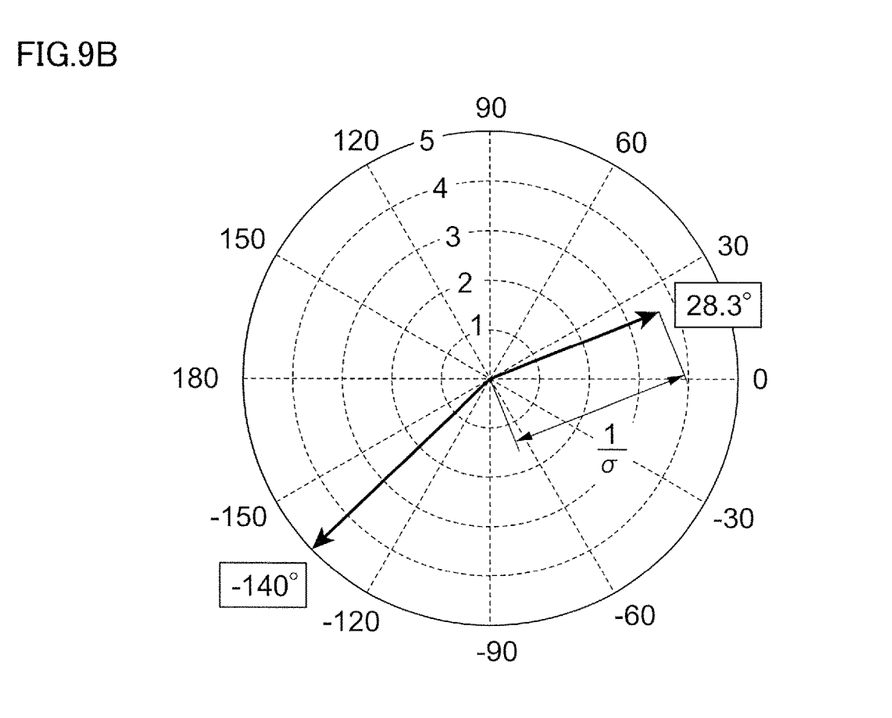

FIGS. 8A, 8B, 9A, and 9B depict the measurement result 2 obtained by the orientation evaluation device 100. Specifically, FIG. 8A depicts measurement areas on a measurement sample 103. FIG. 8B depicts a graph representing a relationship between the angle of the thermal diffusion and the thermal diffusivity. FIG. 9A depicts a graph representing a relationship between the angle of the thermal diffusion and the fiber orientation distribution density function in a bottom left area shown in FIG. 8A. FIG. 9B depicts a vector display of the fiber orientation and intensity obtained from FIG. 9A.

The result explained here was obtained by using a discontinuous fiber CFRTP as the measurement sample 103. In the example shown in the figure, the measurement sample 103 has a plate shape. Specifically, the plate has a square shape with one side being 390 mm length. The plate has about 1.4 mm thickness. The measurement sample 103 is made of long fiber thermoplastics-direct (LFT-D).

As shown in FIG. 8A, multiple points (9 points) on the measurement sample 103 were measured. In the example shown in the figure, the measurement sample 103 was divided into 9 areas (portions) to measure each area, including an upper left area, an upper middle area, an upper right area, a middle left area, a center area, a middle right area, a bottom left area, a bottom middle area, a bottom right area. Each area has one side of 130 mm length. The infrared thermography 17 measured a portion of 44×37 mm at the center of each area. The measurement sample 103 is formed with an extrusion direction along a direction from the bottom to the upper in the figure.

The measurement in each area can be conducted using pieces gained by cutting the measurement sample 103. Alternatively, the measurement can be successively conducted by changing a relative position between the components of the orientation evaluation device 100 and the measurement sample 103 to scan each measuring area on the measurement sample 103.

The method for scanning the measuring position can be one that changes a relative position between the measurement sample 103 and a pair of the microscope 16 and the infrared thermography 17 with, for example, the second xyz stage 7 (an example of a moving portion) shown in FIG. 1.

Further, another method for scanning the measuring position can be the following method, namely: multiple pairs of the microscope 16 and the infrared thermography 17 are arranged in a line such that measuring positions of the respective pairs are aligned with the centers of the respective areas. Further, in this method, the relative positions between the respective pairs of the microscope 16 and the infrared thermography 17, and the measurement sample 103 can be changed in a direction crossing (perpendicular to) the arrangement line.

For example, the second xyz stage 7 shown in FIG. 1 can change the relative positions between the respective pairs of the microscope 16 and the infrared thermography 17, and the measurement sample 103. Further, in this example, each microscope 16 is an example of a light emitting portion. A group of the microscopes 16 is an example of a heating portion. Each infrared thermography 17 is an example of a temperature detecting portion. A group of the infrared thermographies 17 is an example of a detecting portion.

In the above explanation, multiple pairs of the microscope 16 and the infrared thermography 17 are arranged in the line such that measuring positions of the respective pairs are aligned with the centers of the respective areas. However, the multiple pairs of the microscope 16 and the infrared thermography 17 can be arranged in multiple lines to conduct measurement without changing the relative positions.

As shown in FIG. 8B, the in-plane thermal diffusivities of the measurement areas of the respective pieces are varied. That is to say, the angle distribution of the in-plane thermal diffusivity changes according to a position in the measurement sample 103. For example, the upper left area, the upper middle area, the upper right area, the bottom left area, and the bottom right area have relatively large fiber orientation while the middle left area, the center area, the middle right area, and the bottom middle area have relatively small fiber orientation.

The measurement of the multiple areas within the plane of the measurement sample 103 can evaluate thermal anisotropy distribution. Further, the distribution of the fiber orientation of the measurement sample 103 or the distribution (dispersion) of the carbon fibers in the measurement sample 103 is evaluated. The orientation evaluation device 100 can function as a distribution evaluation device evaluating the distribution of the carbon fibers. Further, the orientation evaluation device 100 can function as a device to evaluate a fiber size, besides the distribution of the carbon fibers. For example, the orientation evaluation device 100 can evaluate a diameter of the carbon fibers (e.g. an average fiber diameter) or a length of the carbon fibers (e.g. an average fiber length or a aspect ratio).

As shown in FIG. 8B, the thermal diffusivity anisotropy of the bottom left area is the highest compared to the other areas, so that the orientation of the carbon fibers of this area can be distinguished from the other areas. The measurement result of the bottom left area will be explained in detail below.

As shown in FIG. 9A, in the bottom left area, the frequency distribution of the fiber orientation distribution density function becomes the maximum when the angle is around 30° and −140°. Based on this measurement result, the orientation angle of the carbon fibers in the measurement sample 103 is estimated to be around 30° and −140°. Further, based on the measurement result, the standard deviations σ were respectively 0.27 and 0.21, and the averages p of the distribution were respectively 0.48 and 0.54.

As shown in FIG. 9B, calculation results of the fiber orientation angle were respectively 28.3° and −140°. As shown in FIG. 9B, the orientation of the carbon fibers in the measurement sample 103 is visually recognizable by vector representation (polar coordinates representation) In the vector representation, the degree of the fiber orientation is displayed as a length of vector, along with the fiber orientation angle of the carbon fibers. The length is 1/σ, i.e. the reciprocal of the standard deviations σ.

<Other Examples>

In the above explanation, the calculation result display portion 24 displays (outputs) the calculation result of the fiber orientation and the dispersion on the display (not shown). However, a step to output the calculation result is not limited to this. In some embodiments, the calculation result may be output to another device, or the calculation result may be stored in another device.

In some embodiments, information on the thermal diffusivity, which is gained in a step to calculate the fiber orientation and the dispersion, may be displayed (output or stored) with the calculation result of the fiber orientation and the dispersion. Alternatively, information on one of the fiber orientation and the dispersion may be displayed (output or stored).

In the above explanation, information on the fiber orientation is shown as the fiber orientation angle. However, the information on the fiber orientation is not limited to this. In some embodiments, the information may be shown without the fiber orientation angle itself. For example, the fiber orientation angle may be compared with a threshold and information indicating that the fiber orientation angle exceeds the threshold may be shown. Alternatively, information on the thermal diffusivity distribution may be shown as a graph, for example.

In the above explanation, the fiber orientation distribution density function is derived by fitting with the least-squares method to obtain the fiber orientation and the dispersion. However, the fitting method is not limited to this. In some embodiments, ellipse approximation fitting to the thermal diffusivity distribution obtained by non-dimensional elliptical distribution with the least-squares method may be applicable. Further, other density functions may be applicable.

In the above explanation, the diode laser 10 heats the front surface of the measurement sample 1 and the infrared thermography 17 measures temperature of the rear side of the measurement sample 1. However, the layout for the temperature measurement is not limited to this. In some embodiments, the measurement by the infrared thermography 17 and the heating by the diode laser 10 may be conducted on the same side of the measurement sample 1. Note that if the measurement by the infrared thermography 17 and the heating by the diode laser 10 are conducted on the different sides of the measurement sample 1 as in the above exemplary embodiment, influence of heat reflection can be reduced compared to the layout in which the measurement by the infrared thermography 17 and the heating by the diode laser 10 are conducted on the same side of the measurement sample 1.

In the above explanation, the measurement samples 1, 101, 103 are explained as the carbon fiber reinforced plastics. However, the measurement samples 1, 101, 103 are not limited to this. The measurement samples 1, 101, 103 may only be required to include multiple types of materials having different thermal conductivity to each other. Further, in the above explanation, the measurement samples 1, 101, 103 include the carbon fibers as the reinforcement. As long as the carbon fibers elongate in one direction, the carbon fibers can have any shape, e.g. an elongated shape, a rectangular shape, a columnar shape, a polygonal shape, and an oblong spherical shape.

Further, if the orientation evaluation device 100 is used as the distribution evaluation device, the reinforcement can have any shape, e.g. a particle shape, a spherical shape, and a pelletized shape, besides the shape elongating in one direction.

In the above explanation, various embodiments and modifications have been described. These embodiments and modifications may be combined.

Further, the present disclosure is not limited to the above embodiments at all, and can be implemented in various forms without departing from the gist of the present disclosure.

REFERENCE SIGNS LIST

1 . . . Measurement sample
10 . . . Diode laser
17 . . . Infrared thermography
20 . . . Computer
21 . . . Phase lag distribution measurement portion
22 . . . Thermal diffusivity distribution calculation portion
23 . . . Orientation calculation portion
24 . . . Calculation result display portion

The invention claimed is:

1. An orientation evaluation device comprising:
   a heating portion configured to periodically irradiate a sample with light to heat the sample from one side of the sample, the sample comprising a plurality of materials;
   a detecting portion configured to detect delay in response to a change in a temperature distribution of an area of the sample from an opposite side of the heating portion relative to the sample, the area including a spot heated by the heating portion; and
   an output portion configured to determine and output information on orientation angle and degree of concentration to the orientation angle of at least one material included in the sample based on the delay in the response detected by the detecting portion.

2. The orientation evaluation device according to claim 1, wherein
   the sample comprises a reinforcement material of a fiber shape and a base material holding the reinforcement material, and
   the output portion outputs the information on the orientation of the reinforcement material in the sample.

3. The orientation evaluation device according to claim 1, wherein the output portion outputs information on thermal diffusivity of the sample with the information on the orientation of the sample, based on the delay in the response detected by the detecting portion.

4. The orientation evaluation device according to claim 1, wherein the output portion outputs the orientation of the sample in a form of polar coordinates, based on the delay in the response detected by the detecting portion.

5. The orientation evaluation device according to claim 1, further comprising a moving portion configured to change a relative position between the sample and a pair of the heating portion and the detecting portion, wherein
the heating portion successively heats each one of portions of the sample, the sample being divided into the portions, each portion being periodically heated,
the detecting portion successively detects each one of temperature distributions of the respective portions successively heated by the heating portion, and
the output portion outputs information on the orientation of each portion of the sample.

6. The orientation evaluation device according to claim 1, wherein
the heating portion comprises a plurality of light emitting portions, the plurality of light emitting portions being arranged in a line such that irradiation positions of the respective light emitting portions are aligned with centers of respective areas to be measured,
the detecting portion comprises a plurality of temperature detecting portions detecting temperature distributions of the respective areas, and
the orientation evaluation device further comprises a moving portion configured to change a relative position, in a direction crossing the line, between the sample and a set of the plurality of light emitting portions and the plurality of temperature detecting portions.

7. A method for evaluating orientation comprising:
periodically irradiating, via a heating portion, a sample with light to heat the sample from one side of the sample, the sample comprising a plurality of materials;
detecting delay in response to a change in a temperature distribution of an area of the sample from an opposite side of the heating portion relative to the sample, the area including a heated spot; and
determining and outputting information on orientation angle and degree of concentration to the orientation angle of at least one material included in the sample based on the delay in the detected response.

8. A distribution evaluation device comprising:
a heating portion configured to periodically irradiate a sample with light to heat the sample from one side of the sample, the sample comprising a plurality of materials;
a detecting portion configured to detect delay in response to a change in a temperature distribution of an area of the sample from an opposite side of the heating portion relative to the sample, the area including a spot heated by the heating portion; and
an output portion configured to output information on a distribution of at least one material included in the sample based on the delay in the response detected by the detecting portion.

9. An orientation evaluation device comprising:
a heating portion configured to periodically irradiate a sample with light to heat the sample, the sample comprising a plurality of materials;
a detecting portion configured to detect delay in response to a change in a temperature distribution of an area of the sample, the area including a spot heated by the heating portion; and
an output portion configured to determine and output information on orientation angle and degree of concentration to the orientation angle of at least one material included in the sample based on the delay in the response detected by the detecting portion,
wherein the output portion outputs the orientation of the sample in a form of polar coordinates, based on the delay in the response detected by the detecting portion.

10. An orientation evaluation device comprising:
a heating portion configured to periodically irradiate a sample with light to heat the sample, the sample comprising a plurality of materials;
a detecting portion configured to detect delay in response to a change in a temperature distribution of an area of the sample, the area including a spot heated by the heating portion;
an output portion configured to determine and output information on orientation angle and degree of concentration to the orientation angle of at least one material included in the sample based on the delay in the response detected by the detecting portion; and
a moving portion configured to change a relative position between the sample and a pair of the heating portion and the detecting portion,
wherein
the heating portion successively heats each one of portions of the sample, the sample being divided into the portions, each portion being periodically heated,
the detecting portion successively detects each one of temperature distributions of the respective portions successively heated by the heating portion, and
the output portion outputs information on the orientation of each portion of the sample.

11. An orientation evaluation device comprising:
a heating portion configured to periodically irradiate a sample with light to heat the sample, the sample comprising a plurality of materials;
a detecting portion configured to detect delay in response to a change in a temperature distribution of an area of the sample, the area including a spot heated by the heating portion; and
an output portion configured to determine and output information on orientation angle and degree of concentration to the orientation angle of at least one material included in the sample based on the delay in the response detected by the detecting portion,
wherein
the heating portion comprises a plurality of light emitting portions, the plurality of light emitting portions being arranged in a line such that irradiation positions of the respective light emitting portions are aligned with centers of respective areas to be measured,
the detecting portion comprises a plurality of temperature detecting portions detecting temperature distributions of the respective areas, and
the orientation evaluation device further comprises a moving portion configured to change a relative position, in a direction crossing the line, between the sample and a set of the plurality of light emitting portions and the plurality of temperature detecting portions.

* * * * *